United States Patent
Vienot et al.

(10) Patent No.: US 8,444,887 B2
(45) Date of Patent: May 21, 2013

(54) METHODS AND SYSTEMS FOR CONVERSION OF MOLTEN SULFUR TO POWDER SULFUR

(75) Inventors: Michael E. Vienot, Glenview, IL (US); Lee Chin, Houston, TX (US); Riley B. Needham, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/179,099

(22) Filed: Jul. 8, 2011

(65) Prior Publication Data

US 2012/0018913 A1    Jan. 26, 2012

Related U.S. Application Data

(60) Provisional application No. 61/366,789, filed on Jul. 22, 2010, provisional application No. 61/412,443, filed on Nov. 11, 2010.

(51) Int. Cl.
*B29B 9/00*    (2006.01)

(52) U.S. Cl.
USPC ............ 264/13; 264/14; 23/293 S; 23/293 A; 425/6; 425/10

(58) Field of Classification Search
None
See application file for complete search history.

(56) References Cited

U.S. PATENT DOCUMENTS

| | | | |
|---|---|---|---|
| 3,295,950 A | | 1/1967 | Blouin et al. |
| 3,318,666 A | | 5/1967 | Every et al. |
| 3,761,136 A | * | 9/1973 | Every ............................... 406/48 |
| 3,838,979 A | * | 10/1974 | Sims .............................. 23/293 S |
| 3,933,956 A | * | 1/1976 | Mavrovic ......................... 264/14 |
| 3,965,067 A | | 6/1976 | Jin |
| 4,024,210 A | | 5/1977 | Chalmers |
| 4,151,234 A | | 4/1979 | Schofield |
| 4,218,411 A | * | 8/1980 | Price et al. ......................... 264/8 |
| 4,225,297 A | * | 9/1980 | Tomita et al. ...................... 425/6 |
| 4,238,429 A | * | 12/1980 | Sasaki et al. ..................... 264/13 |
| 4,263,012 A | * | 4/1981 | Leszczynska et al. .... 23/313 FB |
| 4,389,356 A | * | 6/1983 | Higgins ............................ 264/9 |
| 4,394,150 A | | 7/1983 | Garrison, Jr. et al. |
| 4,497,635 A | | 2/1985 | Blackwood |
| 4,705,467 A | * | 11/1987 | Bakker ............................ 425/7 |
| 4,923,482 A | | 5/1990 | Menar |

(Continued)

OTHER PUBLICATIONS

Bill Hannemann, Larry Hopper and Jim Molnar, "Molten Sulphur Transport Review and Current Thoughts", 5 pages.

(Continued)

*Primary Examiner* — Mary F Theisen
(74) *Attorney, Agent, or Firm* — ConocoPhillips Company

(57) ABSTRACT

Methods and systems are provided for converting molten sulfur to powder sulfur by gas cooling of atomized sprays of molten sulfur. Certain embodiments contemplate a vertical tower that allows molten sulfur to produce an atomized spray or mist of molten sulfur descending from the top of the vertical tower. Gas introduced to the bottom of the vertical tower flows upward intimately interfacing with the descending atomized molten sulfur spray. The molten sulfur in the form of an atomized sulfur spray is cooled by the gas to form a sulfur powder. In certain embodiments, the sulfur powder formed is sufficiently small to be suitable for combination with a base fluid for producing a slurry for convenient transport of the sulfur particulates. Advantages of certain embodiments include higher efficiencies, lower cost, and production of much smaller solid sulfur average particulate sizes, which in turn allows for easier sulfur transport.

21 Claims, 1 Drawing Sheet

U.S. PATENT DOCUMENTS

| | | | |
|---|---|---|---|
| 5,460,765 A | 10/1995 | Derdall et al. | |
| 5,475,059 A | 12/1995 | Brands | |
| 5,514,307 A * | 5/1996 | Shirley et al. | 264/14 |
| 6,228,905 B1 | 5/2001 | Soderberg et al. | |
| 6,555,087 B2 | 4/2003 | Pascual et al. | |
| 6,582,025 B2 | 6/2003 | Pickren | |
| 6,672,798 B2 | 1/2004 | Pickren | |
| 7,097,392 B2 | 8/2006 | Stecher | |
| 7,226,572 B1 | 6/2007 | Keller et al. | |
| 7,533,719 B2 | 5/2009 | Hinson et al. | |
| 7,631,689 B2 | 12/2009 | Vinegar et al. | |
| 2002/0171159 A1 * | 11/2002 | Matthaei et al. | 264/9 |
| 2006/0043002 A1 | 3/2006 | Petrinec et al. | |
| 2007/0251686 A1 | 11/2007 | Sivrikoz et al. | |
| 2009/0200018 A1 | 8/2009 | Sivrikoz et al. | |
| 2009/0241803 A1 | 10/2009 | Mahmoudkhani et al. | |

OTHER PUBLICATIONS

L.Y. Chin and C.T. Montgomery, "A Numerical Model for Simulating Solid Waste Injection in Soft Rock Reservoirs", SPE 90507, 2004, Society of Petroleum Engineering, Inc., 14 pages.

* cited by examiner

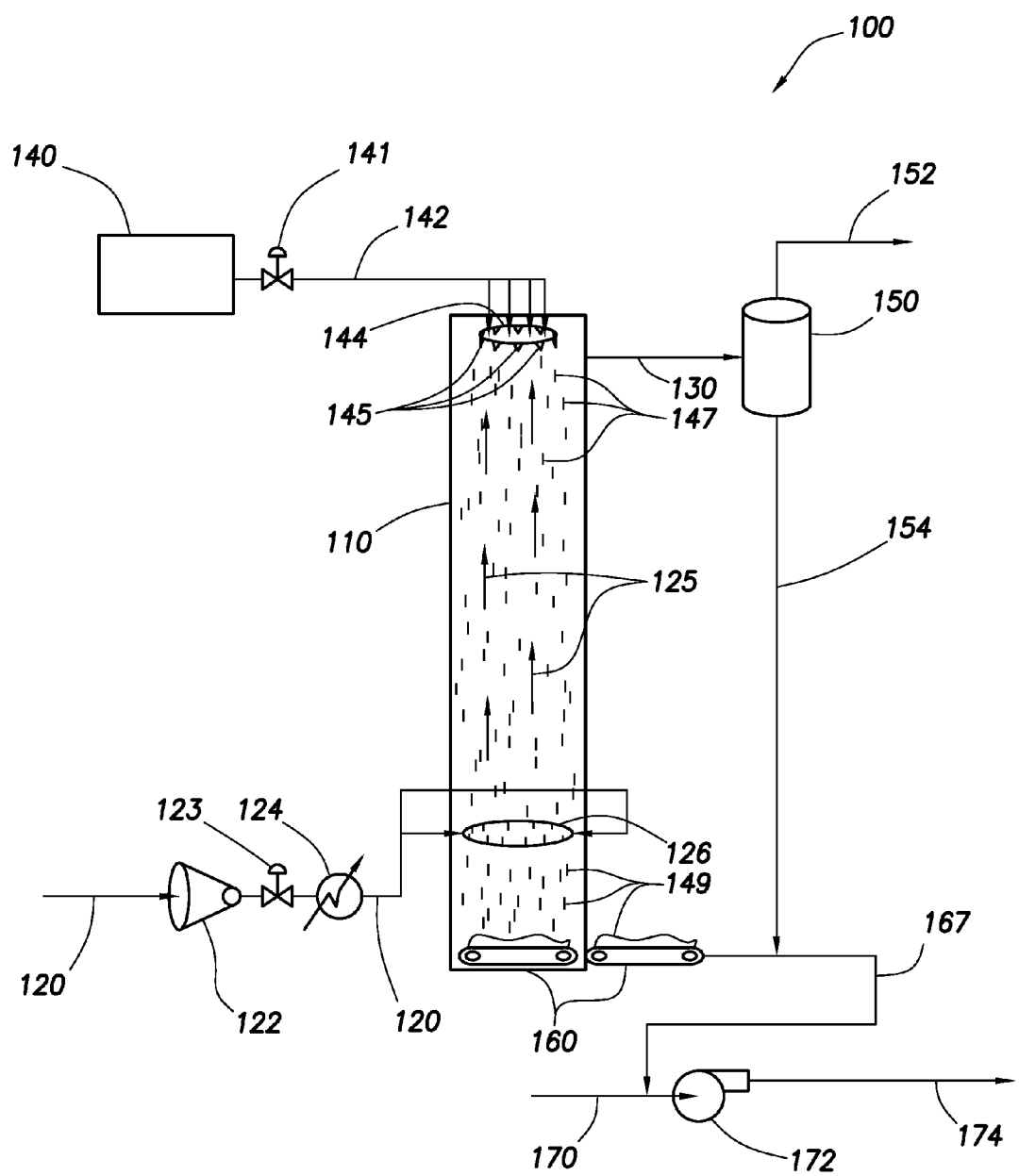

METHODS AND SYSTEMS FOR CONVERSION OF MOLTEN SULFUR TO POWDER SULFUR

CROSS-REFERENCE TO RELATED APPLICATIONS

This application is a non-provisional application which claims the benefit of and priority to U.S. Provisional Application Ser. No. 61/366,789 filed Jul. 22, 2010, entitled "Methods and Systems for Conversion of Molten Sulfur to Powder Sulfur," and U.S. Provisional Application Ser. No. 61/412,443 filed Nov. 11, 2010, entitled "Methods and Systems for Sulfur Disposal," both of which are hereby incorporated by reference in their entirety.

FIELD OF THE INVENTION

The present invention relates generally to methods and systems for conversion of molten sulfur to powder sulfur. More particularly, but not by way of limitation, embodiments of the present invention include methods and systems for conversion of molten sulfur to powder sulfur by gas cooling of atomized sprays of molten sulfur.

BACKGROUND

Millions of metric tons of elemental sulfur are produced each year, primarily as a by-product of natural gas production and petroleum refining, and native sulfur mining industries. Sulfur is also produced as a by-product in coal-fired power plant operations and tar sands development, and in any industrial process that reduces the sulfur level in fuels or effluents for purposes of complying with air quality standards.

In some cases, the sulfur content of naturally occurring hydrocarbons may be as high as 15 vol % or even higher. The presence of sulfur compounds in hydrocarbons is typically highly undesirable, because sulfur compounds are usually extremely harmful, even lethal, to breathe. Moreover, sulfur compounds can be extremely corrosive.

Sulfur compounds recovered from extracted hydrocarbons may take many forms. In some cases, the recovered sulfur compounds are already in the form of elemental sulfur, while in other cases, the sulfur compounds are converted to elemental sulfur for disposal or delivery. In still other cases, the sulfur compounds may be converted to other useful sulfur-based compounds such as sulfuric acid by a WSA Process unit.

Hydrogen sulfide is one example of a common sulfur compound found in naturally-occurring hydrocarbons. Hydrogen sulfide has an extreme acute toxicity, flammability, noxious odor, insidious odor sensory depression, and corrosiveness. In part for these reasons, almost all of the hydrogen sulfide is converted to water and elemental sulfur at or near the site where the hydrogen sulfide is produced.

Because the presence sulfur compounds in extracted hydrocarbon is highly undesirable, hydrocarbon producers usually endeavor to treat produced hydrocarbons to remove sulfur compounds such as hydrogen sulfide. Therefore, produced hydrocarbons are typically processed to remove any sulfur compounds to reduce the sulfur concentration to acceptable levels. Indeed, processing hydrocarbons to remove sulfur compounds is an instrumental part of the hydrocarbon production value chain.

The sulfur compounds recovered from hydrocarbons is either disposed of or transported for end use by others. Typically, the primary sulfur compound recovered from hydrocarbons is elemental sulfur. A continuing challenge in the industry is the transportation or disposal of this elemental sulfur. The refining process which produces elemental sulfur usually produces the elemental sulfur in the form of molten sulfur. Thus, one is faced with the challenge of transporting or disposing of molten sulfur or converting the molten sulfur to some bulk solid sulfur for transportation or disposal. Handling of both forms of elemental sulfur, i.e. molten sulfur and bulk solid sulfur, present significant complications.

Transporting molten sulfur itself without converting it to solid form presents a number of challenges. Proper storage methods are required to ensure the sulfur is not contaminated, that it does not damage equipment (e.g. corrosion, fires), and that it does not harm the environment. Transporting sulfur in molten form requires maintaining its temperature at above approximately 115° C. (~240° F.). While transport over short distances can be done in well insulated containers, over longer distances, a heating system is required to maintain the sulfur in the liquid state. Molten sulfur must be handled and stored within a relatively narrow range of temperatures. Too hot and the sulfur viscosity rises quickly and the sulfur cannot be pumped. Too cold and the sulfur will solidify. Once solidified in a storage vessel, it is difficult to liquefy again due to the low thermal conductivity of solid sulfur. Because molten sulfur is inherently hazardous, systems for transporting molten sulfur involve higher cost to provide the required containment. Moreover, insulation and/or heating mechanisms must be provided during transport to preserve the molten sulfur in its molten state, which necessarily adds additional costs. A tank that has just carried molten sulfur cannot be easily cleaned so that the trailer can carry a different commodity on the return trip or to another destination. The result is that the tank is full on the delivery trip but is empty on the return trip. Larger quantities of molten sulfur may also be transported by rail or by water vessels, but the same transport challenges remain. At the destination, additional heating such as by steam may need to be provided to melt any sulfur that may have solidified during transport. For all of these reasons, handling molten sulfur, either for transportation or for disposal, is beset with a multitude of difficulties and is generally a disfavored method of transporting and/or disposing of sulfur.

Thus, the majority of sulfur around the world is transported as a bulk solid. The sulfur is often stored in the open in huge stockpiles at terminals ready to be loaded onto ships, railcars or truck or at plant sites to be melted and used in the production of sulfuric acid.

Bulk sulfur may be produced from sulfur that has been crushed from larger pieces. Another form of sulfur, slate sulfur, is formed by pouring molten sulfur on a moving belt where it is solidified into a continuous slab with a thickness of 3 to 5 mm. The sulfur begins to break into smaller pieces when it is separated from the belt and when sulfur is discharged from the belt at the head pulley. This process produces irregular shaped pieces with sharp edges.

Granulated sulfur is produced by spray coating sulfur particles to increase their size to produce dense spherical solid granules. Small seed particles of sulfur are introduced at the feed end of a rotating drum. The particles are spray coated with molten sulfur as the particles move down the drum towards the discharge. Each layer of molten sulfur that is applied is cooled to solidification before the next coat is applied. Through repeated application of sulfur layers, a granule size of 1 to 6 mm diameter is produced. Fines are minimal at the production stage and the round shape of the granule resist further degradation to fines.

The WetPrill™ process involves pumping molten sulfur onto a perforated plate. The sulfur flows through the perforations in the form of droplets. The droplets fall into an agitated water bath which solidifies and cools the sulfur into pellets. The pellets are separated from the water in dewatering screens.

While industrial chemicals and commodities can be transported long distances by pipeline, in many cases more economically than by rail or other forms of shipment, pipeline transfer has not been used for sulfur or for only short distances at most. This lack of use is due in part to the high melting point of sulfur, the corrosiveness of sulfur when dissolved in typical solvents or when in contact with air or moisture, and the tendency of sulfur to precipitate from solution. When shipped as a solution or slurry, sulfur tends to deposit on the pipeline walls, resulting in plating, plugging, and line blocking, all of which lead to unreliability, high maintenance, and excessive power consumption.

The storage and disposal of sulfur pose challenges as well, particularly those arising from environmental concerns. Disposal in an environmentally sound yet economical manner is achievable, but at significant expense. Disposal currently consists of converting molten sulfur to solid blocks for above-ground storage, injecting sulfur as acid gas into geologic formations, or oxidizing hydrogen sulfide to sulfur oxides and injecting the sulfur oxides underground for storage. Sulfur disposal as acid gas involves significant injection pressures accompanied by systems mechanical integrity risks. Whereas above ground storage requires a significant environmental footprint and appropriate handling equipment both for the pour and block systems and the recovery of solid sulfur for future sale. Underground fluid injection into existing storage caverns is capital intensive and requires unique geologic conditions.

Thus, conventional methods suffer from a variety of disadvantages, including high cost, inefficiency, and substantial transportation/disposal complications. Accordingly, there is a need in the art for enhanced systems and methods that address one or more disadvantages of the prior art.

SUMMARY

The present invention relates generally to methods and systems for conversion of molten sulfur to powder sulfur. More particularly, but not by way of limitation, embodiments of the present invention include methods and systems for conversion of molten sulfur to powder sulfur by gas cooling of atomized sprays of molten sulfur.

One example of a method for forming sulfur powder from molten sulfur comprises the steps of: providing a tower; introducing a molten sulfur to the tower through a plurality of atomization nozzles to form an atomized molten sulfur spray; allowing the atomized molten sulfur spray to descend in the tower; introducing a gas to the tower; allowing the gas to flow through the tower counterflow to the atomized molten sulfur spray; allowing the gas to intimately interface with the atomized molten sulfur spray and cool the atomized molten sulfur spray to form a sulfur powder; allowing the sulfur powder to descend the tower under the influence of gravity; and withdrawing the sulfur powder from the tower to form a withdrawn sulfur powder.

One example of a system for forming sulfur powder from molten sulfur comprises: a vertical tower having a bottom and a top; a gas inlet in communication with the vertical tower attached to the vertical tower substantially in proximity to the bottom of the vertical tower; a gas outlet in communication with the vertical tower attached to the vertical tower substantially in proximity to the top of the vertical tower; a plurality of atomization nozzles arranged and configured to disperse molten sulfur into an atomized molten sulfur spray substantially in proximity to the top of the vertical tower; and a mechanical mechanism in proximity of the bottom of the vertical tower arranged and configured to remove sulfur powder formed in the tower that descends through the vertical tower and onto the mechanical mechanism wherein the mechanical mechanism is arranged and configured to introduce sulfur powder to a sulfur outlet.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 1 illustrates a schematic of a system for forming sulfur powder from molten sulfur in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for conversion of molten sulfur to powder sulfur. More particularly, but not by way of limitation, embodiments of the present invention include methods and systems for conversion of molten sulfur to powder sulfur by gas cooling of atomized sprays of molten sulfur.

In certain embodiments, a vertical tower is configured to allow molten sulfur to produce an atomized spray or mist of molten sulfur descending from the top of the vertical tower. Gas is introduced to the bottom of the vertical tower and flows upward, intimately interfacing with the descending atomized molten sulfur spray. The gas then cools the atomized sulfur spray to form a sulfur powder. In certain embodiments, the sulfur powder formed is sufficiently small to be suitable for combination with a base fluid for producing a slurry for convenient transport of the sulfur particulates.

Advantages of the embodiments disclosed herein as compared to many conventional methods include, but are not limited to, a higher efficiency, lower cost, and production of much smaller solid sulfur particulate sizes on average. Furthermore, conversion of the molten sulfur to a sulfur powder allows for a much more convenient form of transport. Where the sulfur powder is mixed into a slurry, high loading rates of sulfur powder may be achieved in some embodiments, ultimately allowing for a more economical transport of the sulfur.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a schematic of a system for forming sulfur powder from molten sulfur in accordance with one embodiment of the present invention.

Conversion system 100 is a schematic of a system for converting molten sulfur to sulfur powder. Molten sulfur is produced by process unit 140. Process unit 140 may be any process that produces molten sulfur such as a refining unit that removes sulfur from extracted hydrocarbons. The molten sulfur is supplied to vertical tower 110 via molten sulfur inlet line 142.

The molten sulfur is then fed through atomization nozzles 145 by way of atomization nozzle ring 144. Molten sulfur control valve 141 may provided to control the flow rate of molten sulfur fed to tower 110. Typically, molten sulfur used in conjunction with the methods herein will have a sulfur concentration of at least about 90% wt and in certain embodiments, at least about 98% wt sulfur. Atomization nozzles 145 are configured to disperse molten sulfur into atomized molten sulfur spray 147. Gas is introduced to vertical tower 110 by way of gas inlet line 120. Gas blower or compressor 122 provides motive energy for supplying gas to vertical tower 110. Gas control valve 123 may be provided to further regulate the flow of gas supplied to tower 110. In certain embodiments, the supplied gas is cooled by cooler 124. The supplied gas enters vertical tower through gas injection ring 126. In this way, gas 125 is directed to flow towards the top of vertical tower 110 counterflow to the descending atomized molten sulfur spray 147. Atomized molten sulfur spray 147 forms sulfur powder 149 upon intimate mixing or interfacing of atomized molten sulfur spray 147 with gas 125.

In certain embodiments, nozzle diverters or fins (not shown) may be incorporated into the physical configuration of the system to promote dispersion of the gas entering the tower. In this way, ideal mixing of the gas and the atomized molten sulfur spray may be encouraged.

In certain embodiments, sulfur powder 149 may be formed that comprise fine sulfur particulates from about 1 micron to about 10 microns in diameter. Certain preferred embodiments will form sulfur particulates from about 1 micron to about 3 microns in diameter. Still other embodiments will form sulfur particulates about 2 microns in diameter.

In certain embodiments, the sulfur powder formed may have a variable particulate size distribution having an average size from about 1 micron to about 10 microns, from about 1 micron to about 3 microns, or less than about 2 microns, or about 2 microns.

Process parameters and operating conditions may be varied to achieve desired particulate sizes. Examples of operating conditions that may be varied include the gas flowrate, gas dispersion, gas inlet temperature, molten sulfur flowrate, atomization of the molten sulfur, molten sulfur temperature, or any combination thereof. Examples of process parameters that may be varied to achieve desired particulate sizes include the physical tower configuration, e.g. tower height and tower diameter, the physical configuration of the sulfur spray nozzles, the gas dispersion ring configuration if present, cooler design, etc.

Sulfur powder 149 formed in vertical tower descends under the influence of gravity and settles at the bottom of vertical tower 110. Sulfur powder 149 that accumulates at the bottom of vertical tower 110 may be removed by withdrawal mechanism 160. Withdrawal mechanism 160 is any device suitable for transporting sulfur powder 149. Examples of withdrawal mechanisms suitable for use with the present invention include, but are not limited to hydraulic mechanisms and mechanical withdrawal mechanisms, or any combination thereof In certain embodiments, withdrawal mechanism 160 comprises one or more conveyor belts and/or one or more positive displacement mechanisms such as a positive displacement screw pump. Withdrawal mechanism 160 may include one or more pneumatic or fluid motive mechanisms to direct sulfur powder 149 with a gas or fluid flow. In this way, gas or fluid flow may be used to direct the recovered sulfur powder from the bottom of vertical tower 110 to and through line 167. In certain embodiments, a portion of gas 125 may be used to provide motive energy for transporting sulfur 149.

The withdrawn sulfur powder transported through line 167 may then be mixed into a slurry. In the embodiment depicted in FIG. 1, sulfur powder 149 is fed to the suction of pump 172 via line 170. A base fluid is also fed to pump 172 via line 170 which mixes with sulfur powder 149 to form a sulfur slurry. In certain embodiments, the base fluid comprises water. Any water source may be used including fresh water, sea water, waste water, salt water, formation water, or any combination thereof In certain embodiments, the particulate size is sufficiently small to permit high sulfur loading rates of about 1 to about 6 pounds of sulfur powder per gallon of water.

Surfactants may be added to the sulfur slurry to overcome the hydrophobic nature of sulfur and/or to improve the physical properties of the sulfur slurry. One or more viscosifiers may be introduced to the sulfur slurry to enhance the rheology of the sulfur slurry as desired. Additionally, the slurry and/or base fluid may be heated to improve the rheological properties of the slurry such as yield point and viscosity. Certain embodiments of the slurry may have a viscosity of less than about 10 centipoise. In some cases, heating the slurry reduces potential sulfur precipitation under certain conditions.

Gas 125 exits vertical tower 110 by way of gas outlet 130. Gas 125 exiting vertical tower 110 may entrain some sulfur powder as gas 125 exits vertical tower 110. Separator 150 is provided to separate and recover the entrained sulfur powder from exiting gas 125. Separator 150 may be any device suitable for separating solid particulates from a gas. Examples of separators suitable for use with the present invention include, but are not limited to, cyclones, knock-down trays, open drums or vessels, or any combination thereof Sulfur powder from separator 150 may be routed for use in preparation of the sulfur slurry via cyclone separated solids outlet 154.

Gas from cyclone separator 150 exits largely free of any entrained sulfur powder via cyclone separated gas outlet 152. The exiting gas from cyclone separator 150 may be recycled to vertical tower 110 as desired.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A method for forming sulfur powder from molten sulfur comprising the steps of:
   providing a tower;
   introducing a molten sulfur to the tower through a plurality of atomization nozzles to form an atomized molten sulfur spray;
   allowing the atomized molten sulfur spray to descend in the tower;
   introducing a gas to the tower;
   allowing the gas to flow through the tower counterflow to the atomized molten sulfur spray;
   allowing the gas to intimately interface with the atomized molten sulfur spray and cool the atomized molten sulfur spray to form a sulfur powder;
   allowing the sulfur powder to descend the tower under the influence of gravity;
   withdrawing the sulfur powder from the tower to form a withdrawn sulfur powder; and
   forming a slurry by mixing the withdrawn sulfur powder with an aqueous slurry, wherein the aqueous slurry includes wastewater available from a hydrocarbon production site.

2. The method of claim 1 wherein the sulfur powder forms particulates from about 1 micron to about 10 microns in diameter.

3. The method of claim 2 wherein the sulfur powder forms particulates from about 1 micron to about 3 microns in diameter.

4. The method of claim 3 wherein the sulfur powder forms particulates about 2 microns in diameter.

5. The method of claim 1 wherein the sulfur powder forms particulates having an average size from about 1 micron to about 10 microns.

6. The method of claim 1 wherein the atomized molten sulfur spray comprises forming a mist of droplets from about 1 micron to about 10 microns.

7. The method of claim 1 further comprising the step of introducing a surfactant in aqueous slurry.

8. The method of claim 1 wherein the aqueous slurry has a viscosity of less than about 10 centipoise.

9. The method of claim 1 further comprising the step of introducing a viscosifier to the aqueous slurry.

10. The method of claim 8 wherein the step of forming the slurry occurs at a loading rate of about 1 to about 6 pounds of sulfur powder per gallon of water.

11. The method of claim 1 wherein the step of withdrawing comprises withdrawing the sulfur powder by a pneumatic mechanism wherein the pneumatic mechanism comprises blowing the sulfur powder gas using a portion of the gas introduced to the tower.

12. The method of claim 1 wherein the step of withdrawing comprises withdrawing the sulfur powder by a mechanical or hydraulic mechanism that actuates a rolling conveyor belt for removing the sulfur powder.

13. The method of claim 2 further comprising the steps of:
   withdrawing the gas from the tower to form an exiting gas;
   allowing the exiting gas to entrain a portion of the sulfur powder formed in the tower to form a sulfur powder entrained gas; and
   introducing the sulfur powder entrained gas to a separator;
   wherein the separator comprises a cyclone separator for separating the sulfur powder from the entrained powder gas stream to form a recovered sulfur powder.

14. The method of claim 13 further comprising the step of recycling the recovered sulfur powder by introducing the recovered sulfur powder to the molten sulfur.

15. The method of claim 13 further comprising the step of recovering the recovered sulfur powder by introducing the recovered sulfur powder to the withdrawn sulfur powder.

16. The method of claim 13 wherein the tower is a vertical tower; wherein the molten sulfur is introduced substantially at the top of the vertical tower.

17. The method of claim 2 wherein the gas comprises air.

18. The method of claim 2 further comprising the step of cooling the gas before the step of introducing the gas to the tower.

19. The method of claim 18 further comprising the step of cooling the gas to a temperature of at least about 10 degrees Fahrenheit below ambient temperature.

20. The method of claim 2 further comprising the steps of:
   withdrawing the gas from the tower to form an exiting gas; and
   allowing the exiting gas to entrain a portion of the sulfur powder formed in the tower; and
      providing a knock-down tray through which the exiting gas flows wherein the knock-down tray is configured to remove a portion of the sulfur powder that is entrained in the exiting gas.

21. The method of claim 3 further comprising:
   forming a slurry from the sulfur powder wherein the slurry comprises an aqueous slurry;
   wherein the aqueous slurry has a viscosity of less than about 10 centipoise;
   forming the slurry occurs at a loading rate of about 1 to about 6 pounds of sulfur powder per gallon of water;
   wherein the step of withdrawing the sulfur powder comprises withdrawing the sulfur powder by a pneumatic mechanism wherein the pneumatic mechanism comprises blowing the sulfur powder gas using a portion of the gas introduced to the tower;
   withdrawing the gas from the tower to form an exiting gas;
   allowing the exiting gas to entrain a portion of the sulfur powder formed in the tower to form a sulfur powder entrained gas;
   introducing the sulfur powder entrained gas to a separator;
   wherein the separator comprises a cyclone separator for separating the sulfur powder from the entrained powder gas stream to form a recovered sulfur powder;
   recovering the recovered sulfur powder by introducing the recovered sulfur powder to the withdrawn sulfur powder;
   wherein the tower is a vertical tower;
   wherein the molten sulfur is introduced substantially at the top of the vertical tower;
   wherein the gas comprises air; and
   cooling the gas before the step of introducing the gas to the tower.

* * * * *